Aug. 9, 1960 E. J. WASP Re. 24,857

FLUID HEATERS

Original Filed Oct. 31, 1955 3 Sheets-Sheet 1

INVENTOR.
EDWARD J. WASP
BY
Harry B. Keck
ATTORNEY

FLUID HEATERS
Original Filed Oct. 31, 1955 3 Sheets-Sheet 2
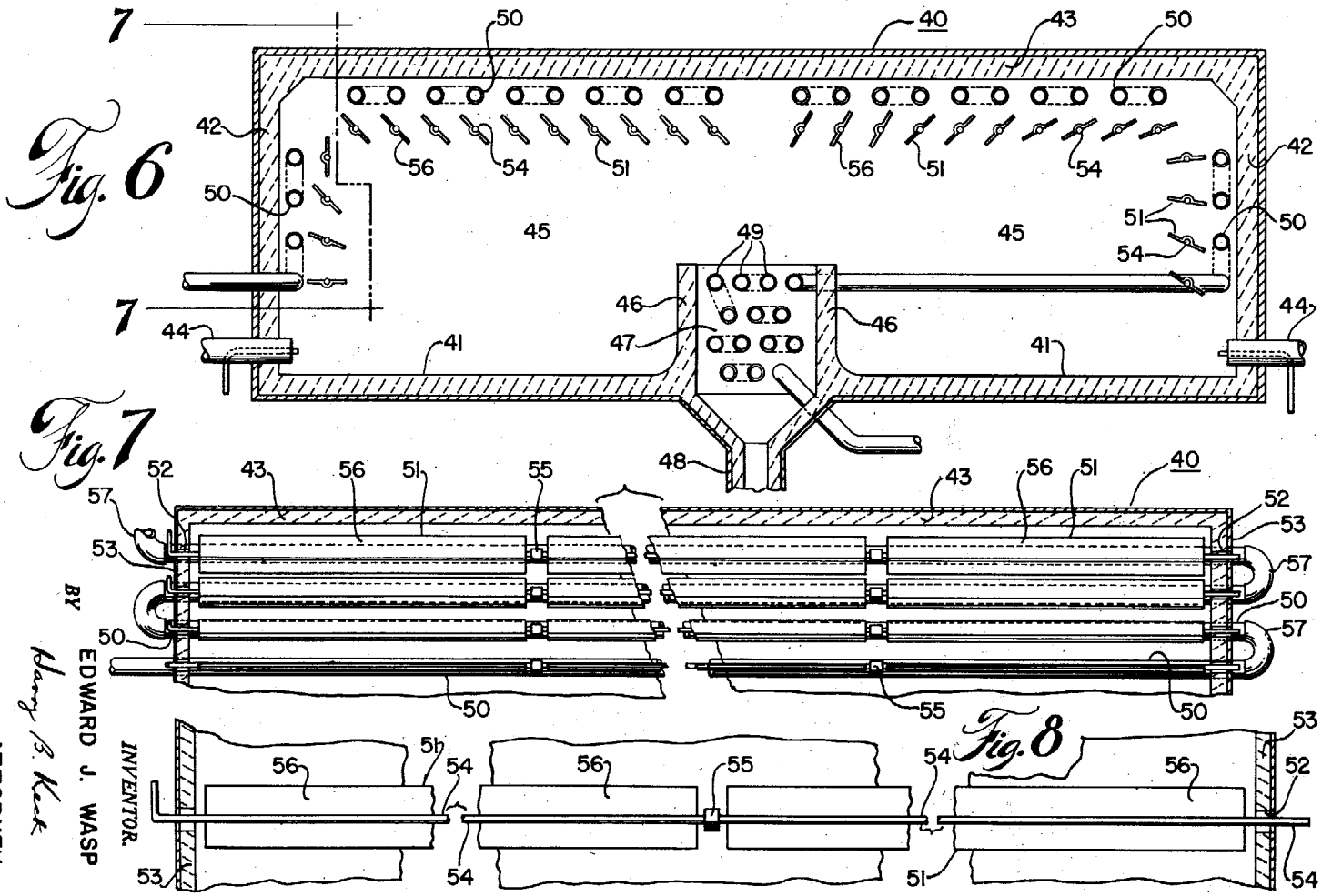
INVENTOR.
EDWARD J. WASP
BY Harry B. Keck
ATTORNEY

FLUID HEATERS

Original Filed Oct. 31, 1955 3 Sheets-Sheet 3

INVENTOR.
EDWARD J. WASP
BY Harry B. Keck
ATTORNEY

United States Patent Office

Re. 24,857
Reissued Aug. 9, 1960

24,857

FLUID HEATERS

Edward J. Wasp, 1079 Lindendale Drive, Pittsburgh, Pa.

Original No. 2,789,521, dated Apr. 23, 1957, Ser. No. 543,907, Oct. 31, 1955. Application for reissue Apr. 21, 1958, Ser. No. 732,410

2 Claims. (Cl. 110—98)

Matter enclosed in heavy brackets [ ] appears in the original patent but forms no part of this reissue specification; matter printed in italics indicates the additions made by reissue.

The present invention relates to improvements in furnace construction and, more particularly, to apparatus for providing control over heating rates within fluid heating furnaces.

In furnaces adapted for heating fluids, conduits are provided as passages for the fluids undergoing thermal treatment. The thermal treatment may be designed to elevate the temperature of the fluids, or to maintain a constant temperature by supplying the endothermic heat of chemical reactions experienced by the fluids within the furnace tubes. Frequently one furnace is called upon to perform both heating duties. In such applications, sensitive control over the rate of introducing heat into the tubes is desirable.

Means for increasing the sensitivity of control over heat input rates, moreover, would introduce versatility into industrial fluid heaters which would permit one heater to be employed for a variety of differing heat supplying duties. In many industrial fluid furnaces, one installation is employed for the thermal treatment of several different fluid streams, each of which calls for a different heating duty. With existing furnaces, the precise adjustment of heat input to each stream cannot be accomplished readily. Usually there is only one source of radiant heat within the furnace; this single source radiates thermal energy among the various heating sections according to the geometry and construction of the furnace. Alteration of these physical properties of the furnace requires a major reconstruction of the installation.

In accordance with the present invention I have provided means for obtaining the desired sensitivity of control over heat input rates in industrial fluid heaters. My invention permits accurate regulation of the heat input at any and all points along the heating tubes in the radiant section of industrial fluid heaters. Accordingly any desired time-temperature pattern for the fluids undergoing thermal treatment can be obtained. In addition, by my invention, one industrial fluid heater can be adapted to supply heat requirements for a multiplicity of processes through simple adjustments which can be effected without necessity for cooling, dismantling and altering the furnace construction.

To accomplish these desirable results I have provided adjustable shields having a manually variable shielding area for the heating tubes within the radiant section of industrial fluid heaters. The shields are strips of heat reflecting material, each mounted within the furnace between at least one tube and the radiant source. The longitudinal axis of each shield is parallel to that of the heating tubes and, in the preferred embodiment, is pivotal about an axis parallel to the tubes to project an umbra for thermal radiation which can be varied in area between the projection of the thickness of the shielding strip (as a minimum) to the projection of the width of the shield (as a maximum). In an alternative embodiment of the present invention, the heat reflecting shield is longitudinally adjustable to vary the length of the heating tube or tubes which is encompassed within the umbra of heat shielding. In either case, manual adjustment, readily accomplished outside the heater, permits the furnace operator to regulate the amount of shielding for each heating tube.

I am aware that prior furnaces have been constructed in which all or a portion of the heating tubes have been shielded, for example, by covering a portion or all of one or more tubes with radiant heat reflecting material. Such furnaces are limited to providing only one heating duty without major revision of the furnace. My present invention may be conveniently applied to existing furnaces which are not presently adapted for regulation of heating duty. My present invention is aimed at providing means for varying the heating duty which a particular industrial furnace may supply. In fact my present invention may be used successfully with those prior furnaces having permanent heat shielding surfaces constructed therein.

For a clear understanding of the present invention, its objects and advantages, reference should be had to the following description and accompanying drawings in which:

Figure 6 is a side elevation view in cross-section of a typical horizontal pipe furnace adapted to the practice of the present invention;

Figure 7 is a cross-section view of the horizontal furnace illustrated in Figure 6 taken along the line 7—7;

Figure 8 is a fragmentary sectional view of the modification illustrated in Figure 7;

Figure 1:
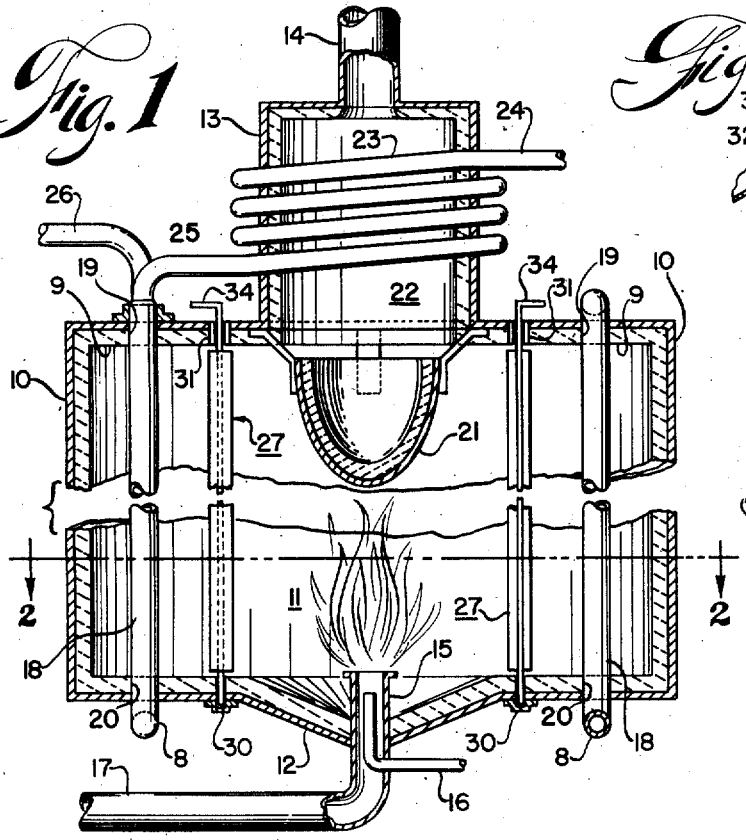
Figure 1 is a side elevation view in cross-section of a typical vertical pipe furnace.

The vertical pipe furnace illustrated in Figure 1 comprises an outer cylindrical casing 10 of sheet metal lined with refractory material. The lined casing 10 defines a radiant chamber 11 which is bounded by a refractory lined floor 12 at the bottom and a top wall 9, having a center opening and joining a cylindrical casing 13, which defines a convection section 22. A flue 14 surmounts the convection section 22 for discharge of waste gases. A burner 15 is provided in the bottom of the radiant chamber 11 for combustion of fuel introduced through a fuel supply conduit 16. Air to support combustion is supplied through a conduit 17.

Vertical heat exchanger tubes 18 are provided within the radiant chamber 11, mounted in a circular pattern adjacent to the casing wall 10. These heat exchanger tubes pass through openings 19 in the top wall 9 of the furnace and through openings 20 in the floor 12 of the furnace. Adjacent tubes are joined in headers at the top (not shown) and headers 8 at the bottom to maintain a series flow of fluids through the heat exchanger tubes. A reradiating cone 21 is mounted at the center of the structure near the top of the radiant chamber 11 to increase the transfer of heat through reradiation of thermal energy within the radiant chamber 11.

The convection section 22 of the furnace provides for direct transfer of heat from hot gases to incoming fluids through heat exchanger tubes 23 mounted in heat exchange relation within the convection section 22. Fluids to be treated in the furnace are introduced through a conduit 24 for preliminary heat treatment in the convection section 22. Fluids, thus preheated, are introduced through conduit 25 into the transfer tubes 18 of the radiant chamber 11 for passage through all such tubes in series. In some furnaces, of course, parallel flow is provided through several tubes; in other furnaces, more than one stream of fluid is thermally treated. The thermally treated fluids are removed from the furnace through an outlet conduit 26. As described thus far, the apparatus shown in Figures 1 and 2 forms part of the prior art.

Figure 3:
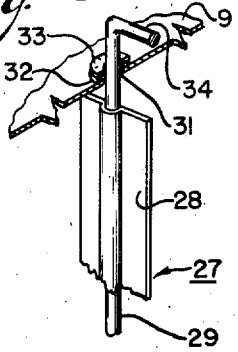
Figures 3, 4 and 5 are fragmentary sectional views showing end connections and modifications for the shielding elements indicated in Figure 1 by the numeral 27.

The present invention calls for the installation of variable shielding elements 27 within the radiant chamber 11 between the heating tubes 18 and the radiant heat source 15. These variable shielding elements 27, shown in enlarged cut-away section in Figures 3, 4 and 5, comprise in the preferred embodiment a flat band of heat reflecting material 28, preferably metal, fixed to a rotatable shaft 29.

The rotatable shafts 29 are vertically mounted in a circular locus within the radiant chamber 11 inside the circular locus of heating tubes 18. The bottom of each rotatable shaft 29 is rotatably supported in a bearing journal 30 associated with the bottom wall 12 of the furnace. The top of the shaft extends upwardly through an opening 31 in the top wall 9 of the furnace. An annular flat bearing surface 32 may be provided about the top wall opening 31 at the outer surface of the top wall 9 of the furnace to support a disk bearing surface 33 secured to the upper extra-furnace extension of the rotatable shaft 29. A handle 34, perpendicular to the rotatable shaft 29, may be provided at the upper end of its upper extra-furnace extension to permit positioning from outside the furnace of the flat shielding element 27 within the radiant chamber 11. The handle 34 should lie in the same plane as the flat shielding surface 28 to permit visual adjustment of the position of each shielding element 27.

Figure 2:
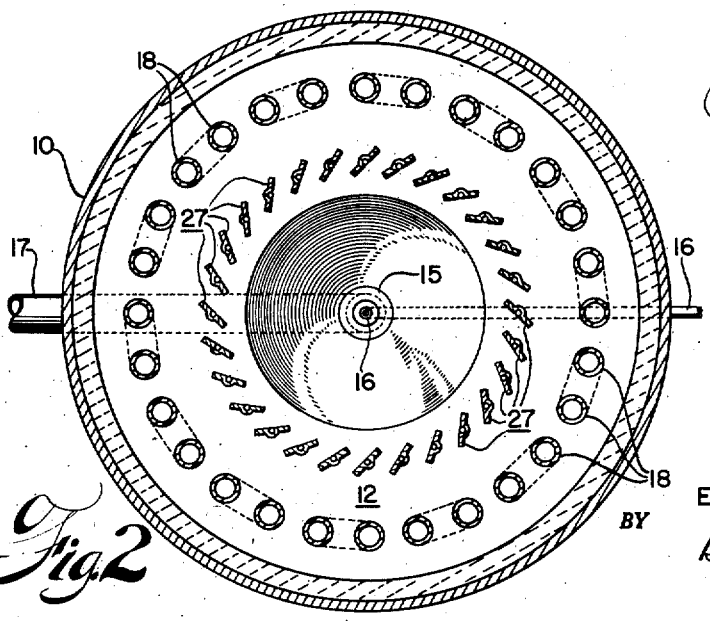
Figure 2 is a cross-section view of the pipe furnace of Figure 1 taken along the line 2—2.

According to Figure 2, one shielding element 27 is provided for each heating tube 18 within the radiant chamber 11. Radiant heat, projected from the burner 15, must pass through the circular locus of shielding elements 27 to radiate upon the heating tubes 18. When a shielding element 27 is positioned with its flat surface perpendicular to this straight line flow of radiant heat energy, the shielding surface 28 reflects much of the heat back into the radiant chamber 11. With the shielding elements 27 parallel to the flow of heat energy, there is essentially no obstruction to the flow of heat to the heating tubes 18.

Figure 4:
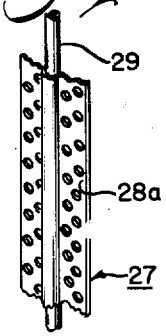
Figure 5:
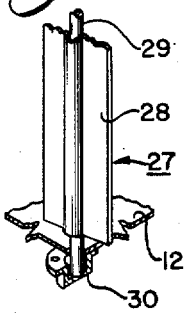

While in general it is simpler and thus preferred to provide solid surfaces for the band of heat reflecting material 28, it is within the scope of this invention to provide heat reflecting surfaces having perforations as indicated by the fragment 28a in Figure 4. Another alternative construction, not shown, would provide for a simple screen material as the band of heat reflecting material.

By regulating the positions of the various shielding elements 27, it is possible to vary the amount of heat received by each of the heating tubes 18 to provide any desired heating pattern for the fluids flowing through the furnace's sequence of heating tubes 18. For example, where the heating duty calls for rapid heating of reactants to a reactant temperature followed by "soaking" of the reactants at reaction temperature for a definite residence period, those shielding elements associated with heating tubes near the inlet end of the fluid flow would be set parallel to the heat flow; those near the outlet end would be set perpendicularly to the heat flow. As another example, where the furnace is employed to heat more than one stream of fluids, the precise heating duty for each stream may be provided by positioning the heat reflecting elements 27 until each stream leaves the furnace in its desired thermal condition according to the thermal energy input at the burner 15.

The present invention also can be applied to furnaces other than the vertical type illustrated in Figures 1 and 2.

As an example, a horizontal furnace of conventional design is shown in cross-section in Figures 6 and 7. The horizontal furnace 40 comprises a bottom refractory surface 41, vertical refractory side walls 42 and a refractory 43. A source of heat such as a burner 44 is provided at each side of the furnace 40 for combustion of fuel with air. Hot gaseous products of combustion pass through a radiant chamber 45 of the furnace 40 at each side, over a firewall 46 and out from the furnace through a convection heating chamber 47 and a flue 48.

Horizontal heating tubes 49 are provided in the convection heating chamber 47 and horizontal heating tubes 50 are provided within the radiant chamber 45 along the side walls 42 and roof 43 of the furnace to absorb radiant heat. The horizontal heating tubes 50 extend through the end walls 53 (see Figure 7) of the horizontal furnace 40; adjacent heating tubes 50 are joined externally of the end walls 53 in headers 57 for the return of fluid under treatment to the radiant chamber 45. As thus far described, the apparatus of Figures 6 and 7 belong to the prior art and is intended to represent any fluid heating furnace of the horizontal variety.

Shielding elements 51 according to the present invention are provided on horizontal axes between the heating tubes 50 and the source of radiant heat which in Figure 6 comprises the burners 44. The shielding elements 51 are mounted at each end through openings 52 in the end walls 53 of the furnace 40 shown in Figures 7 and 8.

Each shielding element 51 comprises a horizontal rotatable shaft 54 extending through end wall openings 52 and, if desired, supported at various positions along the length of the element by journals or brackets 55 to prevent sagging. Each shielding element 51 includes, in addition to the horizontal rotatable shaft 54, a band of heat reflecting material 56 operable to present essentially no obstruction to the passage of radiant heat when parallel to the flow of radiant heat from the heat source 44 to the heating tubes 50, and operable to obstruct the flow of radiant heat from the source 44 to the tubes 50 when turned to present an angled surface to the direction of heat radiation. When the band of heat reflecting material 56 is perpendicular to the direction of radiant heat flow, the maximum umbra is cast upon the heat receiving surface, thereby restricting the heat received by the tubes within or partly within the umbra.

One shielding element 51 may be provided for each of the heating tubes 50, or each shielding element 51 may be associated with more or less than one heating tube 50.

As shown, each of the shielding elements 51 (Figures 6, 7, 8) or 27 (Figures 1 and 2) may be provided with a heat reflecting surface extending throughout the length of the heating tubes within the radiant chamber of the furnace. Alternatively, the heat reflecting surface may extend only over a portion of the heating tube length whereby each heating tube is shieldable according to my present invention only over a portion of its length.

The bands of heat reflecting material may be imperforate, such as sheets of metal or similar heat reflecting material. Alternatively, the bands of heat reflecting material may be perforate to provide only a partial umbra for radiant heat shielding of the heating tubes.

Figure 9:
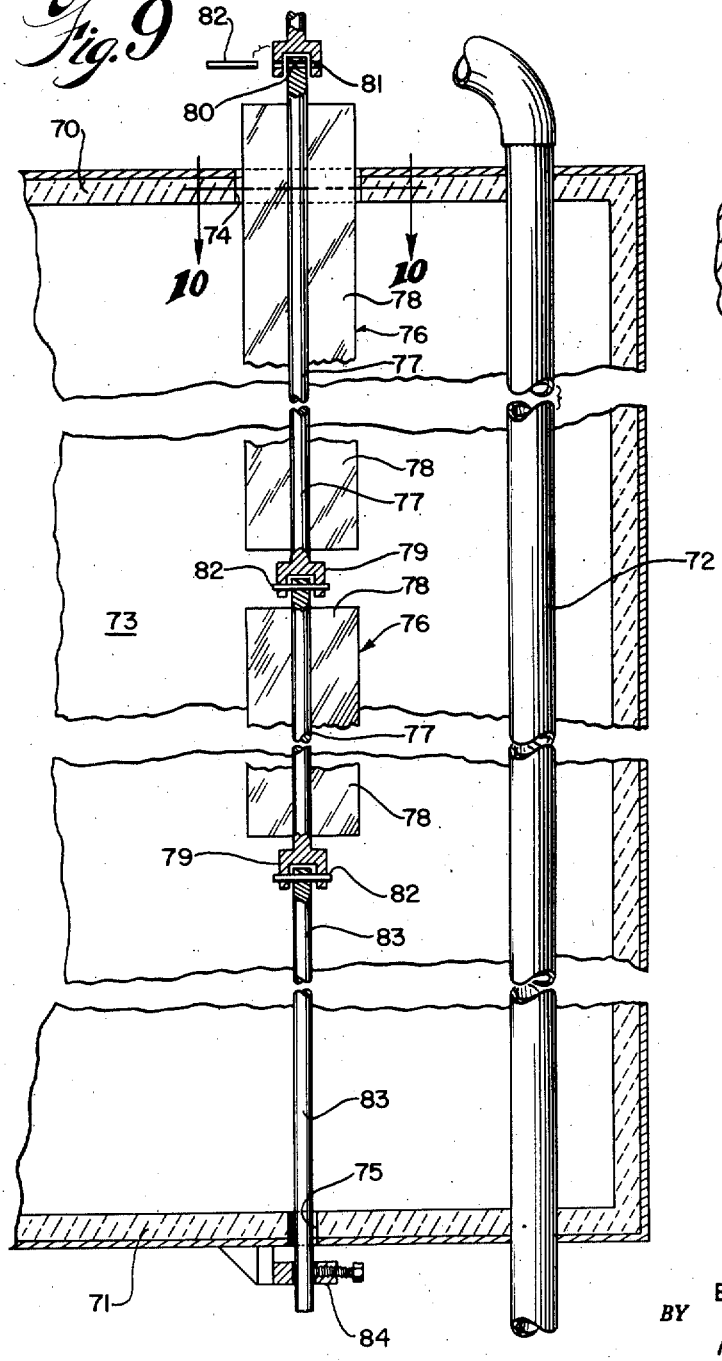
Figure 9 is a fragmentary sectional view of a furnace structure illustrating an alternative modification of this invention.

An alternative embodiment of the present invention is illustrated in Figure 9 wherein one or more heating tubes may be shielded over a portion of heating tube length by varying the length of shielding element inserted within the radiant chamber of the furnace. This embodiment may be applied to either the horizontal or vertical furnace as should be evident from the drawing.

Referring to Figure 9, a fragmentary section of a fluid heating furnace is illustrated wherein opposed furnace walls 70 and 71 are provided through which one or more heating tubes 72 traverse a radiant chamber 73 which is defined by the walls 70 and 71. Apertures 74 and 75 are provided in the furnace walls 70 and 71 respectively to permit inserting of shielding elements 76 therethrough.

Figure 10:
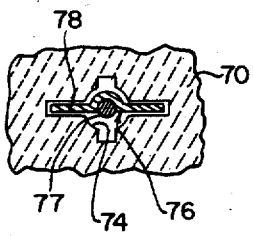
Figure 10 is a fragmentary sectional view taken along the line 10—10 of Figure 9 to illustrate an end opening adapted for practicing the present invention.

Figure 10, which is a fragmentary view taken along the line 10—10 of Figure 9, illustrates the aperture 74 in the furnace wall 70 and shows the shielding element 76 inserted therethrough.

The heat shielding element 76 employed in this embodiment of the present invention comprises an elongated supporting rod 77 which preferably is a circular rod, to which is affixed a band of heat reflecting material 78 which serves as the heat reflecting surface. One end of each supporting rod 77 is provided with coupling means for connection with coupling means at the end of the supporting rod 77 of a connected shielding element 76. This coupling means may take the form shown in Figure 9 wherein a coaxial sleeve 79 at the lower end of the upper supporting rod 77 is adapted for receiving the plain upper end of a supporting rod 77 of the subjacent shielding element 76. Both the plain end of the supporting rod 77 and the sleeve 79 may be provided with pin-receiving openings 80 and 81 respectively for the insertion of a retaining pin 82.

Plain circular supporting rods 83 may be provided which are engageable with the supporting rods 77 of the shielding elements 76 but which are not equipped with heat reflecting surfaces. A concatenation of shielding elements 76 and plain supporting rods 83 is extended from one wall aperture 74 through the opposite wall aperture 75 and is secured in the desired position within the radiant chamber 73 by means of an extra-furnace clamping device 84 of any suitable construction adapted to prevent longitudinal movement of the concatenation.

With this embodiment of the present invention, any portion or all of the heating tubes 72 may be shielded within the umbra generated by the shielding elements 76. The shielding may be varied by sliding the entire concatenation of elements through the radiant chamber 73 so that shielding elements 76 extend to the desired length of heating tubes 72. It is further possible to provide additional adjustment of the radiant heat reflecting through rotation of the concatenation of elements.

In horizontal furnaces it may be desirable to provide suitable brackets or journals for supporting the concatenation of shielding elements according to this embodiment of my invention.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and claimed.

I claim:

[1. In a furnace structure having a radiant chamber and a plurality of generally parallel heating tubes mounted about its periphery, and having a radiant heat source within said radiant chamber in direct radiant relation with said tubes, the improvement comprising a plurality of thin, flat, heat reflecting surfaces adjustably positioned within said radiant chamber spaced between said tubes and said radiant heat source, each of said heat reflecting surfaces being adapted to cast an umbra from said radiant heat source upon the periphery of said radiant chamber, means external of said radiant chamber for adjusting each of said heat reflecting surfaces whereby the umbra cast by each of said heat reflecting surfaces can be varied in area to regulate thereby the amount of heat received from said radiant heat source by at least one of said tubes associated therewith.]

[2. In a furnace structure having a radiant chamber and a plurality of generally parallel heating tubes mounted about its periphery, and having a radiant heat source within said radiant chamber in direct radiant relation with said tubes, the improvement comprising at least one thin, flat heat reflecting surface adjustably positioned within said radiant chamber between said tubes and said radiant heat source, said heat reflecting surface being rotatable about an axis parallel to that of said tubes whereby rotation of said heat reflecting surface about said axis varies the area of umbra from said radiant heat source generated by said heat reflecting surface to regulate thereby the amount of heat received by at least one of said tubes which is associated with said heat reflecting surface, and means external of said radiant chamber for controlling the axial position of said heat reflecting surface.]

[3. In a vertical furnace structure having a radiant chamber and a plurality of generally parallel vertical heating tubes mounted about its periphery, and having a radiant heat source within said radiant chamber in direct radiant relation with said tubes, the improvement comprising a plurality of thin, flat, heat reflecting surfaces having a vertical major axis, said heat reflecting surfaces being adjustably positioned within said radiant chamber adjacent said tubes and between said tubes and said radiant heat source, each of said heat reflecting surfaces being rotatable about a vertical axis parallel to said tubes whereby axial rotation of said heat reflecting surfaces varies the width of umbra from said radiant heat source generated by said heat reflecting surface at the periphery of said radiant chamber, whereby the umbra at its maximum width entirely encompasses at least a portion of the length of at least one and less than the total number of said tubes, and means, external of said radiant chamber, associated with each of said heat reflecting surfaces for controlling the axial position of each of said heat reflecting surfaces.]

[4. In a vertical furnace structure having a top wall, a bottom wall and side walls which define a radiant chamber, a plurality of vertical heating tubes mounted within said radiant chamber about its periphery and extending from said top wall to said bottom wall, and a radiant heat source within said radiant chamber in direct radiant relation with said vertical tubes, the improvement comprising a plurality of thin, flat, vertically extending strips of heat reflecting material disposed within said radiant chamber between said tubes and said radiant heat source, whereby each said strip casts an umbra from said radiant heat source upon the periphery of said radiant chamber, a first rotatable means at the end of said strip associated with said top wall and second rotatable means at the end of said strip associated with said bottom wall, said first and second rotatable means defining an axis about which said strip may be rotated from a position aligned with said radiant heat source to a position normal to said radiant heat source and means external of said radiant chamber for controlling the axial position of each said strip to regulate thereby the area of umbra cast by said strip whereby the amount of heat from said radiant heat source received by heating tube associated with said strip may be regulated.]

[5. In a horizontal furnace structure having a radiant chamber, a plurality of horizontal heating tubes mounted about the periphery of said radiant chamber, and having at least one radiant heat source within said radiant chamber in direct radiant relation with at least a portion of said horizontal tubes, the improvement comprising a plurality of thin, flat strips of heat reflecting material, each adjustably positioned horizontally within said radiant chamber between at least one of said horizontal tubes and at least one said radiant heat source whereby each strip casts an umbra from said radiant heat source upon the periphery of said radiant chamber, and each strip being rotatable about a horizontal axis parallel to said tubes whereby the width of umbra cast by said strip can be varied to regulate thereby the amount of heat received from said radiant heat source by at least one of said horizontal tubes associated therewith, and means external of said radiant chamber for adjusting the axial position of each of said strips.]

[6. In a furnace structure having a radiant chamber and a plurality of generally parallel heating tubes mounted about its periphery, and having a radiant heat source within said radiant chamber in direct radiant relation with said tubes, the improvement comprising at least one thin, flat, heat reflecting surface adjustably positioned within said radiant chamber between said tubes and said radiant heat source, said heat reflecting surface being longitudinally moveable along an axis parallel to said heating tubes whereby longitudinal movement of said heat reflecting surface varies the area of umbra from said radiant heat source generated by said heat reflecting surface to regulate thereby the amount of heat received by at least one of said tubes which is associated with said heat reflecting surface, and means external of said radiant chamber for controlling the length of said heat reflecting surface maintained within said radiant chamber.]

[7. In a vertical furnace structure having a top wall, a bottom wall and side walls which define a radiant chamber, a plurality of generally parallel vertical heating tubes mounted within said radiant chamber about its periphery, and extending from said top wall to said bottom wall, and a radiant heat source within said radiant chamber in direct radiant relation with said tubes, the improvement comprising a plurality of thin, flat, heat reflecting surfaces within said radiant chamber adjacent said tubes and between said tubes and said radiant heat source, each of said heat reflecting surfaces being longitudinally moveable along an axis parallel to said heating tubes, whereby longitudinal movement of said heat reflecting surface varies the are of umbra from said radiant source generated by said heat reflecting surface to regulate thereby the amount of heat received by at least one of said tubes which is associated with said heat reflecting surface, at least one aperture in said top wall and said bottom wall to receive each of said heat reflecting surfaces, and means external of said radiant chamber for controlling the length of said heat reflecting surface maintained within said radiant chamber.]

[8. In a horizontal furnace structure having a top wall, a bottom wall, side walls and end walls defining a radiant chamber, a plurality of horizontal heating tubes mounted about the periphery of said radiant chamber extending between said end walls and at least one radiant heat source within said radiant chamber in direct radiant relation with at least a portion of said heating tubes, the improvement comprising a plurality of thin, flat strips of heat reflecting material, each positioned horizontally within said radiant chamber between at least one of said horizontal heating tubes and at least one said radiant heat source whereby each strip casts an umbra from said radiant heat source upon the periphery of said radiant chamber, an aperture in at least one of said end walls for receiving each said strip and through which said strip is longitudinally moveable to control the area of umbra cast by said strip within said radiant chamber and to regulate thereby the amount of heat received from said radiant heat source by at least one of said horizontal heating tubes associated therewith.]

*9. In a vertical furnace structure having a radiant chamber and a plurality of generally parallel vertical heating tubes mounted about its periphery, and having a radiant heat source centrally located within said radiant chamber in direct radiant relation with said tubes, the improvement comprising a plurality of thin, flat, heat reflecting surfaces being adjustably positioned within said radiant chamber adjacent said tubes and between said tubes and said radiant heat source, each of said heat reflecting surfaces positioned to cast an umbra from said radiant heat source generated by said heat reflecting surface at the periphery of said radiant chamber, whereby the umbra entirely encompasses at least a portion of the exposed tube surface of at least one and less than the total number of said tubes, and means, external of said radiant chamber, associated with each of said heat reflecting surfaces for increasing and decreasing the length of each of said heat reflecting surfaces which is interposed between said radiant heat source and said tubes.*

*10. In a furnace structure having a radiant chamber and a plurality of generally parallel heating tubes mounted about its periphery, and having a radiant heat source centrally located within said radiant chamber in direct radiant relation wtih said tubes, the improvement comprising at least one thin, flat, heat reflecting surface adjustably positioned within said radiant chamber between said tubes and said radiant heat source, said heat reflecting surface being longitudinally movable along an axis parallel to said heating tubes whereby longitudinal movement of said heat reflecting surface varies the area of umbra which is cast thereby from said radiant heat source generated by said heat reflecting to regulate thereby the amount of heat received by at least one of said tubes which is associated with said heat reflecting surface, and means, external of said radiant chamber, for controlling the length of said heat reflecting surface maintained within said radiant chamber.*

References Cited in the file of this patent or the original patent

UNITED STATES PATENTS

| | | |
|---|---|---|
| 2,263,004 | Kuhner | Nov. 18, 1941 |
| 2,340,289 | Wallis et al. | Feb. 1, 1944 |
| 2,546,714 | Bataille | Mar. 27, 1951 |
| 2,728,387 | Smith | Dec. 27, 1955 |